United States Patent [19]

Shi

[11] Patent Number: 5,150,215
[45] Date of Patent: Sep. 22, 1992

[54] SINGLE LENS REFLEX CAMERA HAVING FILM AND STILL VIDEO FUNCTIONS

[76] Inventor: Zhimin Shi, 25-17 39th Ave., Long Island City, N.Y. 11101

[21] Appl. No.: 669,875

[22] Filed: Mar. 14, 1991

[51] Int. Cl.⁵ .................. H04N 5/30; H04N 5/225
[52] U.S. Cl. .................. 358/209; 358/909; 358/224; 354/76
[58] Field of Search ............... 358/209, 909, 224, 225, 358/906; 354/75, 76, 219; 359/363, 372, 374, 419

[56] References Cited

U.S. PATENT DOCUMENTS

| | | | |
|---|---|---|---|
| 4,064,516 | 12/1977 | McLaughlin | 354/219 |
| 4,165,933 | 8/1979 | Sunouchi | 354/219 |
| 4,303,322 | 12/1981 | Someya | 354/219 |
| 4,482,230 | 11/1984 | Magariyama | 354/219 |
| 4,689,689 | 8/1987 | Saito | 358/228 |
| 4,704,022 | 11/1987 | Nozawa | 354/219 |
| 4,742,369 | 5/1988 | Ishii | 358/909 |
| 4,757,388 | 7/1988 | Someya | 358/224 |
| 4,763,146 | 8/1988 | Niikura | 354/75 |
| 4,769,699 | 9/1988 | Gebauer | 358/97 |
| 4,949,117 | 8/1990 | Van Heyningen | 358/224 |
| 5,006,871 | 4/1991 | Noble | 354/76 |

FOREIGN PATENT DOCUMENTS 0148773 6/1988 Japan.
0114169 5/1989 Japan.

Primary Examiner—James J. Groody
Assistant Examiner—Sherrie Hsia
Attorney, Agent, or Firm—Ladas & Parry

[57] ABSTRACT

A dual film and still video camera is provided for taking pictures in film and still video images either simultaneously or respectively. The camera comprises a casing, an objective lens, a film loading back, a view finder unit, at least one reflex mirror turntable upward and downward, a still video image capturing unit provided at the focusing screen of the view finder or at a mirror plane of the focusing screen in the lower portion of the casing, means for controlling camera operated in three modes of a video mode, a film mode and a dual mode; and a programmed releasing button for starting the image capturing unit and releasing an film exposure shutter in accordance with one of the three mode selected. The view finder unit can be an electronic view finder system. The reflex mirror can turn from a normally inclined facing up position to a declined facing down position and then turn further up to a horizontal facing down position and return the normal position afterwards. Moreover, an additional mirror can be used to take the declined facing down position.

11 Claims, 3 Drawing Sheets

SINGLE LENS REFLEX CAMERA HAVING FILM AND STILL VIDEO FUNCTIONS

The present invention relates to a dual film and still video camera, more particularly to a single lens reflex camera which can take film photography and pick up still video images either simultaneously or respectively.

BACKGROUND OF THE INVENTION

Since 1981, still video photography has found its market value for its instant result, easy transfer, computer process, and relatively high image resolution. Such images can be picked up by an image sensing device like CCDs and stored or recorded in a medium in either analog form or digital form. Further, it can be reproduced through a monitor or printer and the like and even transmitted to a remote place without losing much resolution of the images. Thus, it is used for various purposes, such as industrial design, documentation, museums or showroom display and so on. However, the resolution of the still video image is still limited in comparison with the still film image. Also, the still video image is very easy to be modified or altered by means of computer or other apparatus. Therefore, it cannot be used for documentation sometimes. In fact, both of the still film image and the still video image cannot be substituted for one another. Accordingly, it becomes desirable to have a camera which can capture both of the images.

To fulfill those demands and to provide a convenient and economic way of capturing such wonderful images, a number of photographic systems and equipments have been developed. Among those, still video and motion video combined camcorder and still video back adaptor for conventional film camera are main trends in the development of such equipments, taking respective advantages of electronic view finder of the motion video and simplicity of the structure of the film camera. Some of double function cameras are described in U.S. Pat. Nos. 4,862,280 and 4,829,384. Both of them are granted to Iida et al.. There are two imaging lenses facing the same object scene and one objective lens provided in the patents of Iida et al. thereby constructing a still camera unit and video camera unit in one system to shoot the same object scene. It is also suggested that the electronic view finder is interchangeable with the optical system for simply changing the way of viewing. However, the two unit structure is relatively complex.

It is known in the art that in a single lens reflex camera an object image is formed on a focusing screen by the light which passes through an objective lens and is reflected by a reflex mirror to the focusing screen. The object image is then inverted by a pentagonal roof prism to a non-inverted image which is observed by a user through an eye-piece lens.

Therefore, there are several patents which utilize the image formed on the focusing screen for different purposes. As described in U.S. Pat. No. 4,894,723 to Takaiwa et al., an image sensing apparatus is provided on the focusing screen to pick-up image which is in turn recorded and measured, and to provide control signals, such as aperture value, upon the measuring result so as to show correct image on an electronic view finder or mini-monitor. Another U.S. Pat. No. 4,855,837 to Tanimoto et al. utilizes the image on the focusing screen to serve for a relay optical system or relay finder optical system; while an attachable still video back can replace the convential film back for taking still video picture.

Further, U.S. Pat. No. 4,303,322 to Someya et al. teaches the use of an electronic image pick-up device attachable to a single lens reflex camera at a receptacle in place of an optical finder unit so that the image thus picked up can be connected to a display device or video tape recorder for remote monitoring and recording. Another U.S. Pat. No. 4,757,388 to Someya et al. shows a camera having built-in CCDs or the like in a position optically equivalent to the film, i.e. the focusing screen. Thus, an electronic view finder is provided in place of an optical finder which enables a user to view the object scene in the finder from either the rear or the front of the camera.

As discussed hereinabove, none of the patents discloses a camera which is simple in structure but enables to take pictures in both film and still video images either simultaneously or respectively.

As discussed hereinabove, none of the patents discloses a camera which is simple in structure but enables to take pictures in both film and still video images either simultaneously or respectively.

SUMMARY OF THE INVENTION

Accordingly, it is an object of the present invention to provide a single lens reflex camera having film and still video functions which enable to take pictures in film and still video images either simultaneously or respectively.

Another object of the present invention is to provide a single lens reflex camera which has conventional film back, still video image capturing device in place of the focusing screen plane of a conventional optical finder system in association with an electronic view finder, means for controlling operation of a reflex mirror to have the camera worked in three modes of selectively picking up still video image and taking film photo either simultaneously or respectively.

Still the other object of the present invention is to provide a single lens reflex camera having film and still video functions which maintains traditional optical view finder system and film back but is equipped, at a mirror plane of the focusing screen or an equivalent optical position to the film plane but opposite to the focusing screen, with a still video image capturing device and means for controlling operation of the camera in three modes by operating at least one reflex mirror to perform the three modes of still video image picking up, film photo taking, and both still video image and film photo taking.

A single lens reflex camera having film and still video functions according to the present invention comprises a camera casing; an objective lens in the front of the casing; a film back provided at the rear portion of the casing; at least one reflex mirror provided between the objective lens and the film back and capable of turning upward and downward; a view finder unit located on the top of the casing; a still video capturing unit provided in a place optically equivalent to the film back, said still video capturing unit including an image sensing device for picking up light signals passing through the objective lens and reflected thereto by the reflex mirror and converting them into electric signals and means for outputting the electric signals for recording; means for controlling the operation of the reflex mirror to have the camera worked in three modes of a video mode for picking up still video image, a film mode for taking film photo, and a dual mode for producing still video image and film photo simultaneously; and a releasing button capable of selectively starting the still video capturing unit and releasing an film exposure shutter simultaneously or respectively in accordance with one of said three modes selected.

In case of using an electronic view finder, the still video capturing unit is located at the focusing screen. One reflex mirror is operated to accomplish one of the three modes by remaining still for directing light toward the still video capturing unit for the video mode, turning up immediately after focusing for the film mode, and remaining still for a desired period and then turning up for the dual mode of both still video and film production.

In case of using optical view finder, the still video image capturing unit is provided at a mirror plane of the focusing screen, i.e. in the lower portion of the casing. In case of one reflex mirror, the reflex mirror first turns 90 degree from the original 45 degree facing up position to a 45 degree facing down position to direct the lights toward the still video capturing unit. Alternatively, a second reflex mirror can be used to occupy the facing down position of reflecting the light from the objective lens to the capturing unit at the bottom of the casing.

Further features of the present invention can be seen from the description of embodiments with reference to the accompanying drawings.

DETAILED DESCRIPTION OF THE INVENTION

Figure 1:
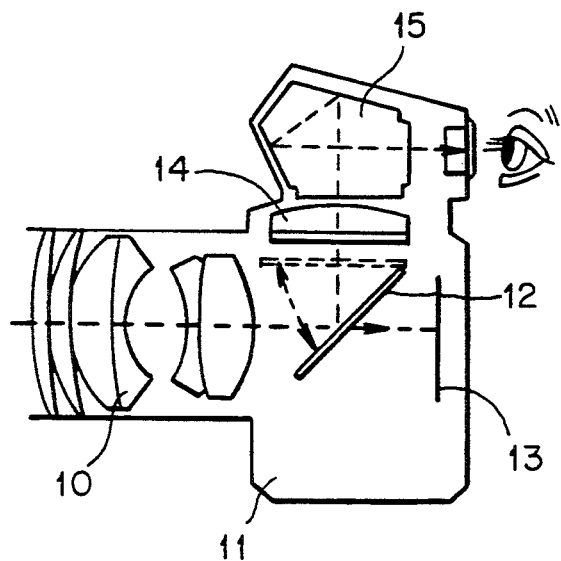
FIG. 1 is a principle view of a traditional single lens reflex camera.
Figure 2:
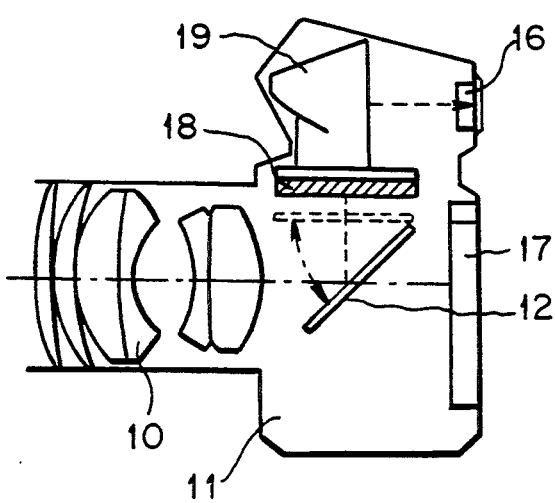
FIG. 2 is a combined figure showing several optional features of electronic view finder with image sensing device and attachable still video back in prior art for the single lens reflex camera.

FIG. 1 shows a conventional SRL camera consisting of a camera casing 11, an objective lens 10, a film loading back 13, a reflex mirror 12, a focusing screen 14, and an optical view finder For further comparison, as shown in FIG. 2, several options of the camera in prior art have been briefly indicated wherein numeral 18 indicates the sensing apparatus in place of the focusing screen 14 of FIG. 1, numeral 19 represents the electronic view finder and numeral 17 represents the still video attachable back in place of the film back 13 of FIG. 1.

Figure 3:
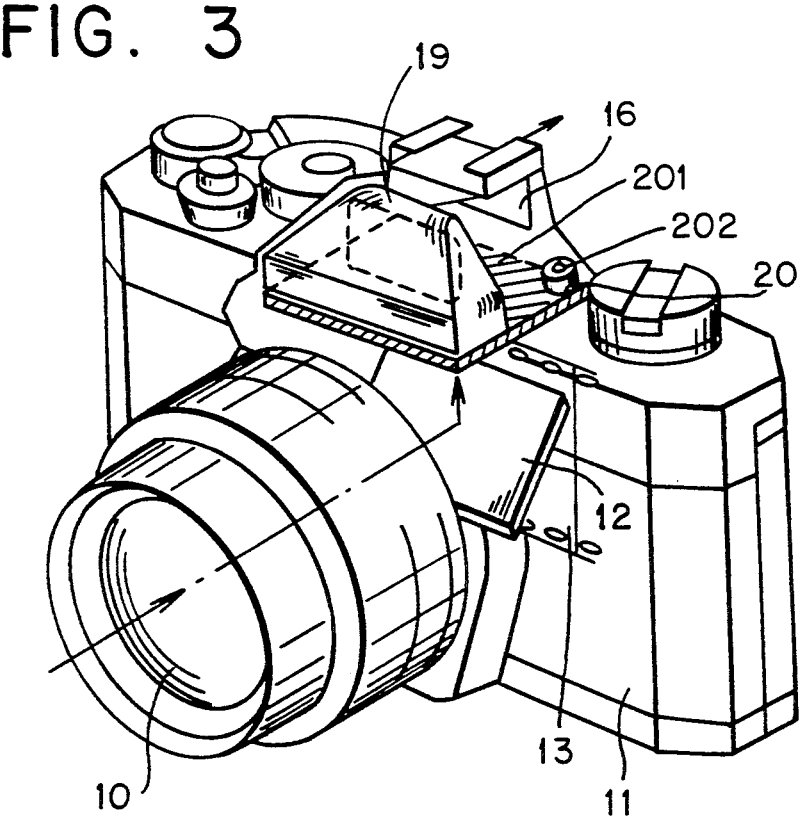
FIG. 3 is a perspective view of a first embodiment of the present invention having the still video capturing unit at the focusing screen plane and the electronic view finder.
Figure 5A:
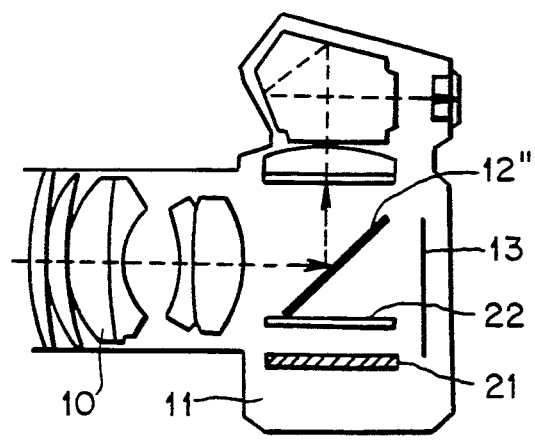
FIGS. 5a to 5c are principle views of a third embodiment of the present invention having two reflex mirrors and the still video image capturing unit at the bottom of the camera casing.
Figure 5B:
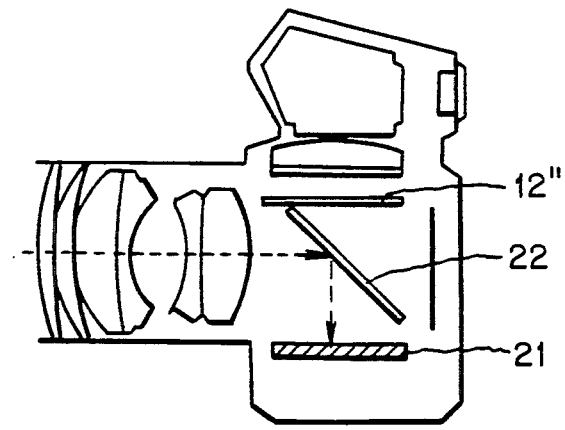

Referring to FIG. 3, the camera of the first embodiment of the present invention comprises an objective lens 10, a camera casing 11, a reflex mirror 12, and a film back 13. Replacing the convetional optical view finder 15 of FIG. 1, there is provided an electronic view finder 19. At the position of the focusing screen 14 of FIG. 1, it is placed a still video image capturing unit 20 instead of a mere image sensing device 18 of FIG. 2. The image capturing unit 20 comprises an image pick-up device 201 like area CCDs and a signal output socket 202. The image capturing unit 20 is mounted between the casing and the electronic view finder. The output socket can be provided at one side of the unit for sending out the electric image signals for the purpose, for instance, of recording.

Further, in this embodiment, a control means (not shown) is provided to operate the reflex mirror 12 enabling the camera work in three modes. In the first mode of picking up still video image only, the reflex mirror maintains in its original 45 degree facing up position without any turning. In the second mode of taking film photo only, the reflex mirror turns up immediately after focusing as a conventional SLR, camera. In the third dual mode of producing still video image and film photo simultaneously, the reflex mirror keeps in the original position for a desired period (the period for adequate production of the image) for still video signal pick-up and turns up thereafter for film exposure.

The operation of the camera is initiated by a releasing button which is programmed in said three modes. It should be understood that in the dual mode the still video capturing unit is operated first and the film exposure shutter second but actually almost simultaneously. In either video mode or film mode, only one of the still video capturing unit and the film exposure shutter can be operated.

Referring to FIGS. 4a to 4c and FIG. 6, the second embodiment of the present invention comprises a camera casing 11, an objective lens 10, a film back 13 and a conventional optical view finder system 15 including the focusing screen 14 and the eye-piece lens 16. In addition, it is provided with a still video image capturing unit 21 at a mirror plane of the focusing screen 14 in the lower portion of the casing. The image capturing unit 21 comprises an image pick-up device 211 and an output socket 212 for sending out the image signals for recording. Moreover, in this embodiment one reflex mirror 12' is made turnable in a sequence of first turning 90 degree from an original 45 degree facing up position, at which the light passing through the objective lens 10 is reflected to the view finder 15, to a 45 degree facing down position so as to direct the light to the still video image capturing unit 21, and second turing from the 45 degree facing down position up to a horizontal facing down position adjacent to the focusing screen 14. Thus, the still video image can be captured at the first turning operation of the mirror and the film photo can be taken at the second turning operation of the mirror.

Figure 4A:
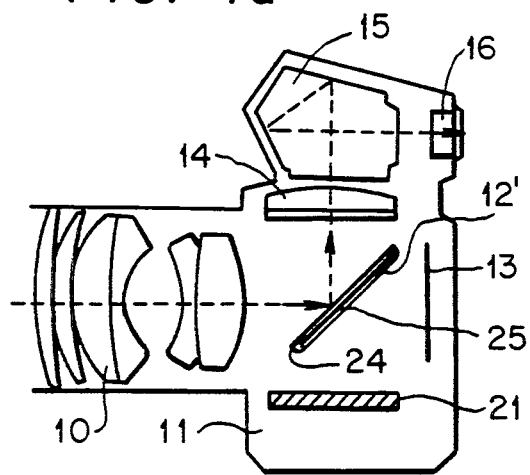
FIGS. 4a to 4c are principle views of a second embodiment of the present invention having a single turnable reflex mirror and the still video image capturing unit at the bottom of the casing.
Figure 4B:
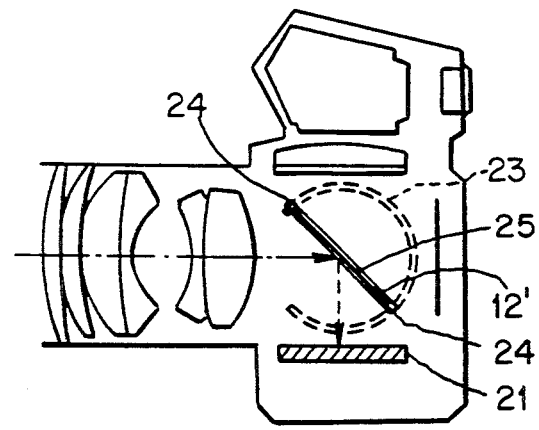
Figure 4C:
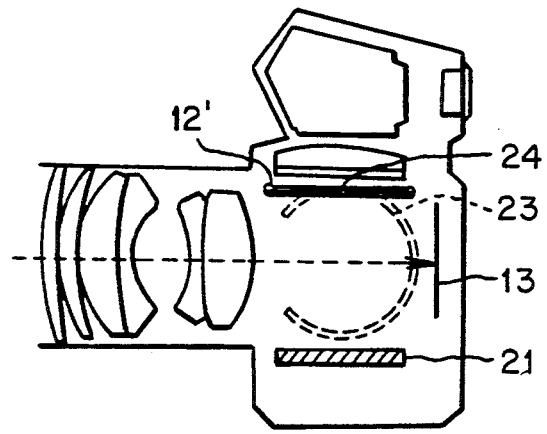
Figure 5C:
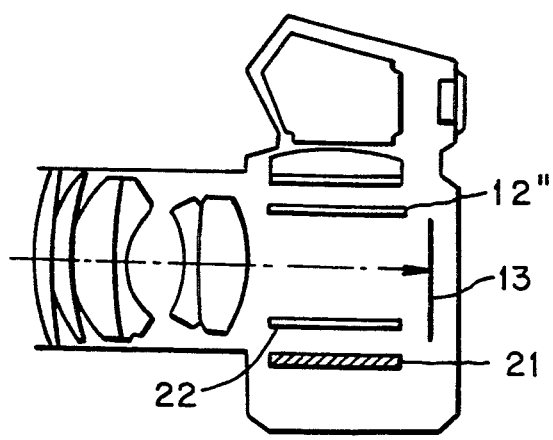
Figure 6:
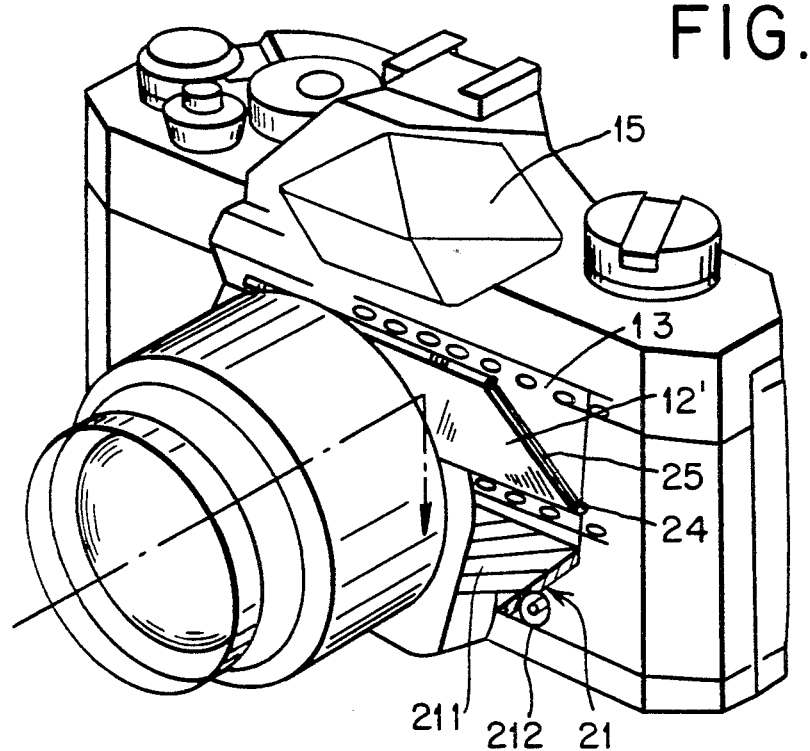
FIG. 6 is a perspective view of the second embodiment of the present invention.
Figure 7:
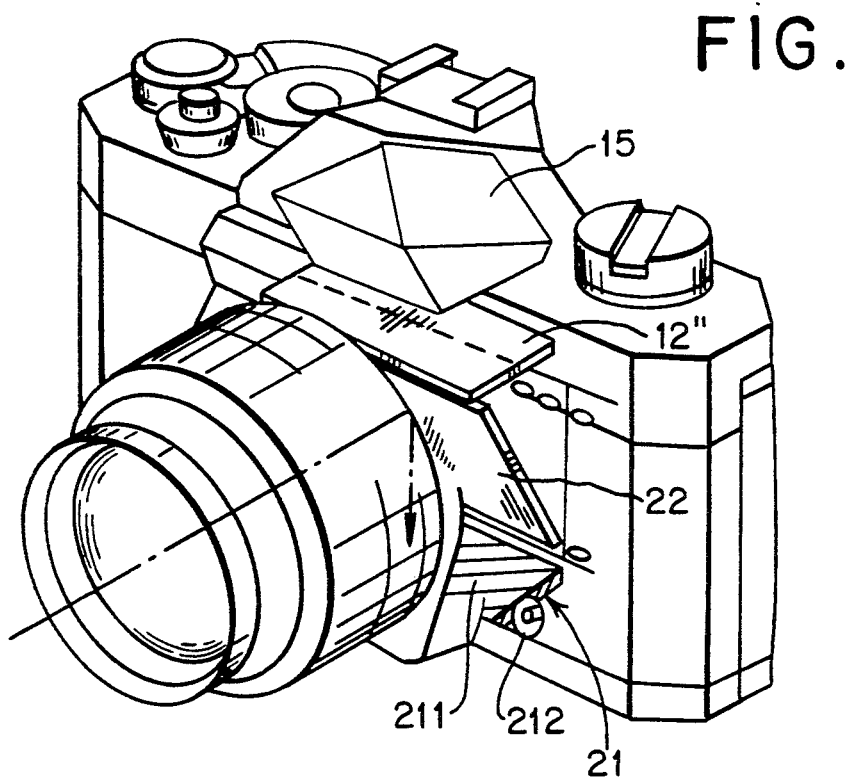
FIG. 7 is a perspective view of the third embodiment of the present invention.

There are many ways to design the mirror turning in that sequence. It is preferred that the mirror slides along a pair of substantially circular guide grooves at each side of the mirror as shown by the dotted-line 23 in FIGS. 4b and 4c. I this embodiment, the three modes of camera operation are carried out by the first turning of the mirror for the video mode, continuous turning of the mirror for the film mode, and sequential turning of the mirror for the dual mode. At the opposite ends of each side of the mirror 12', a pair of small sliding blocks 24 are installed as shown in FIG. 6. They can either slide along the circular guide groove 23 or slide along a groove 25 formed at the side of the mirror. For completing the second turning, the sliding blocks slide toward each other and move to the middle of the side of the mirror as shown in FIG. 4c. It should be understood that an actuating means (not shown) is adapted to accomplish the described operation of the mirror or rather the sliding blocks.

The third embodiment of the present invention is shown in FIGS. 5a to 5c and FIG. 7. There are two reflex mirrors 12" and 22. The first mirror 12" is in a normal 45 degree facing up position between the lens 10 and the film back 13 and the second mirror 22 is in a normal horizontal facing down position, covering a still video image capturing unit 21 provided in the lower portion of the casing. For the dual mode of camera operation, the first mirror 12" works substantially in the same way of the conventional mirror 12. It reflects the light to the focusing screen 14 and turns up for likely exposing the light to the film loading back 13; while the light is blocked by the second reflex mirror 22 which jumps up to a 45 degree facing down position at the same time as the mirror 12" turns up. The second mirror 22 reflects the light to the still video image capturing unit 21 provided at the bottom of the casing thereby creating the still video image signal in the still video capturing unit to be output for recording. At the next sequence, the second mirror 22 turns back to the normal horizontal facing down position. The film is then fully exposed to the light for picture taking.

For the film mode, the mirror 12" acts exactly the same as the reflex mirror 12 of the conventional camera while the second mirror 22 does not move at all. For the video mode, the first mirror 12" and the second mirror 22 turn up simultaneously; while the first mirror 12" follows the second one 22 back to the normal position sequentially for a delayed period of the still video image taking.

One additional feature of the present invention is capable of realizing on-sight simultaneous still video image and film photo production by simply implementing a recording means into the still video capturing unit. Such a recording means could be in a form of magnetic disc magazine including a recording medium and a driving means. The recording circuit could then be installed in the capturing unit and connected with the disc through at least one connector formed on the cover of the disc magazine. The capturing unit as a whole could further be constructed in an intertable unit into a receptacle at either the focusing screen or its mirror plane in accordance with respective embodiments of the described invention.

In accordance with the description above, the present invention is clearly claimed in the accompanying claims.

What I claim is:

1. A single lens reflex camera having film and still video functions, said camera comprising a camera casing; an objective lens; a film back for loading film; a reflex mirror capable of taking a first position reflecting light through the lens to a focusing screen plane and a second position; an electronic view finder unit mounted on the top of the casing; and a still video image capturing unit mounted on the top of the casing; and a still video image capturing unit provided at the focusing screen plane of the view finder, said image capturing unit picking up the light passing through the objective lens and reflected by the reflex mirror and converting the light into electric signals for the electronic view finder and for outputting still video images captured thereon; means for controlling the camera operated in three modes including a still video mode with the reflex mirror remaining in the first position for capturing the still video images, a film mode with the reflex mirror taking the second position for exposing the film and then returning to the first position, and a dual mode with the reflex mirror being respectively in the first position and the second position for producing both the still video and film images; and a releasing button programmed to selectively operate the camera in accordance with one of the three modes.

2. The camera of claim 1, wherein the reflex mirror turns up to the second position immediately after the focusing of the camera in the film mode and the reflex mirror remains in the first position for a desired period before turning to the second position in the dual mode.

3. The camera of claim 1, wherein in the dual mode the still video capturing unit outputs or produces the still video image after the reflex mirror returns in the first position.

4. A single lens reflex camera having film and still video functions, comprising a camera casing, an objective lens; a film back for loading films; an optical view finder unit mounted on the top of the casing; a still video image capturing unit provided in a position opposite to a focusing screen of the view finder for capturing and outputting still video images captured thereon; and a reflex mirror capable of taking a first, a second and a third position; whereby, in the first position, light through the objective lens is reflected to the focusing screen, in the second position, the light is reflected to the till video image capturing unit, and in the third position, the light is directed to the film back; and means for controlling the operation of the reflex mirror thereby enabling the camera operated in three modes including a still video mode, a film mode and a dual mode; and a releasing button being programmed to selectively operate the camera in accordance with one of the three modes.

5. The camera of claim 4, wherein the reflex mirror is made turnable along a pair of guide grooves at each side of the mirror in a first turning from the first position for camera focusing to the second position for capturing the still video image and a second turning from the second position to the third position adjacent to the focusing screen for exposing the film, and said mirror returns the first position upon completion of the film or still video image taking.

6. The camera of claim 5, wherein the reflex mirror completes only the first turning in the still video mode; the reflex mirror continuously completes the second turning in the film mode; and the reflex mirror completes sequentially the first turning and then the second turning in the dual mode.

7. The camera of claim 5, wherein in the dual mode the reflex camera completes continuously the second turning first and then remains in the second position for a desired period during returning to the first position.

8. A single lens reflex having film and still video functions, comprising a camera casing; an objective lens; a film back for loading films; an optical view finder unit mounted on the top of the casing; a still video image capturing unit provided in a position opposite to a focusing screen of the view finder; a first reflex mirror capable of taking a first position for camera focusing and a second position for image taking; and a second reflex mirror normally covering the still video image capturing unit in a first position and reflecting light through the objective lens to the still video image capturing unit in a second position; means for controlling the operation of the first and second reflex mirrors to have the camera working in three modes including a still video mode for picking up still video image, a film mode for exposing the film and a dual mode for producing both the still video and the film images; and a releasing button being programmed to selectively operate the reflex mirrors, and sequentially to actuate the capturing unit or to release a film exposure shutter in accordance with one of the three modes selected.

9. The camera of claim 8, wherein the second reflex mirror jumps up to the second position to reflect the light to the still video image capturing unit, while the first reflex mirror turns up in the still video mode; the second mirror does not move, while the first mirror completes an up and down turning in the film mode; and the second mirror turns up together with the first mirror but returns to its first position for a desired period before the first mirror returns to its first position for a desired period before the first mirror returns in the dual mode.

10. The camera of claim 8, wherein the first mirror turns up to its second position for a desired period before the second mirror turns to its second position, and the first and second mirrors return to their first positions together.

11. The camera of claim 1, wherein said still video capturing unit further comprises a receptacle for accommodating means for recording the picked-up signals in the camera, said recording means being in a disc form and having a recording medium and a driving means therein and at least one electric connector on the cover of the disc for completing electric connection with an electric circuit in the capturing unit.

* * * * *